United States Patent
Yang et al.

(10) Patent No.: US 11,863,619 B1
(45) Date of Patent: Jan. 2, 2024

(54) COMPUTING RESOURCES DISCOVERY VIA REPLACING FILTER PARAMETER OF INPUT QUERY WITH DISCOVERY JOB PARAMETER

(71) Applicant: MICRO FOCUS LLC, Santa Clara, CA (US)

(72) Inventors: Zhong-Yi Yang, Shanghai (CN); Qiuxia Song, Shanghai (CN); Fei Wu, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 18/097,825

(22) Filed: Jan. 17, 2023

(51) Int. Cl.
*H04L 67/1061* (2022.01)
*H04L 67/1074* (2022.01)

(52) U.S. Cl.
CPC ...... *H04L 67/1063* (2013.01); *H04L 67/1076* (2013.01)

(58) Field of Classification Search
CPC ............. H04L 67/1063; H04L 67/1076; H04L 41/5009; H04L 41/5054; G06F 16/285; G06F 8/60; G06F 9/4881; G06N 20/00; G06Q 30/0631
See application file for complete search history.

(56) References Cited

U.S. PATENT DOCUMENTS

| | | | |
|---|---|---|---|
| 7,720,950 B2 | 5/2010 | Joanovic et al. | |
| 10,725,802 B2 | 7/2020 | Fitzgerald et al. | |
| 10,819,557 B1 | 10/2020 | Epshtein et al. | |
| 2010/0115520 A1* | 5/2010 | Kohno | G06F 9/4881 718/101 |
| 2010/0161577 A1* | 6/2010 | Morozov | G06F 16/285 707/705 |
| 2010/0293269 A1* | 11/2010 | Wilson | H04L 41/5054 709/224 |
| 2018/0013637 A1* | 1/2018 | Sanders | G06F 8/60 |
| 2018/0268347 A1* | 9/2018 | Benedetti | G06Q 30/0631 |

(Continued)

OTHER PUBLICATIONS

"Configuration management database" Wikipedia entry, https://en.wikipedia.org/wiki/Configuration_management_database, accessed Dec. 9, 2022.

(Continued)

*Primary Examiner* — Le H Luu
(74) *Attorney, Agent, or Firm* — Sheridan Ross P.C.

(57) ABSTRACT

Prior to initiating discovery of computing resources of an information technology (IT) infrastructure, an input query and a discovery job are received, and one or more trigger configuration items (CIs) are calculated. The input query specifies how the computing resources are discovered, and has a filter parameter. The discovery job is for the input query, has a job parameter, and is associated with a trigger query that is a subset of the input query. The trigger CIs are calculated based on the trigger query, such that the filter parameter of the input query is replaced with the job parameter in the trigger CIs. Discovery of the computing resources is initiated by dispatching each trigger CI. As discovery of the computing resources occurs, CIs representing the computing resources matching the trigger CIs are received, and the CIs are populated within a configuration management database (CMDB).

20 Claims, 5 Drawing Sheets

(56) References Cited

U.S. PATENT DOCUMENTS

2020/0236006 A1* 7/2020 Asba .................. H04L 41/5009
2023/0107309 A1* 4/2023 Patel ..................... G06N 20/00
706/12

OTHER PUBLICATIONS

"Discovery basics", https://docs.servicenow.com/bundle/sandiego-it-operations-management/page/product/discovery/concept/c_GetStartedWithDiscovery.html , accessed Dec. 9, 2022.
"Patterns and horizontal discovery", https://docs.servicenow.com/bundle/sandiego-it-operations-management/page/product/discovery/concept/c-UsingPatternsForHorizontalDiscovery.html, accessed Dec. 9, 2022.

* cited by examiner

COMPUTING RESOURCES DISCOVERY VIA REPLACING FILTER PARAMETER OF INPUT QUERY WITH DISCOVERY JOB PARAMETER

BACKGROUND

A configuration management database (CMDB) is a database used by an entity, such as a corporation, to store information regarding computing resources, including hardware resources and software resources. The computing resources may be represented within the database as corresponding configuration items (CIs). A CMDB organizes CIs into logical layers, and further serves as a data warehouse for storing information regarding the relationships among CIs. A CMDB provides a way to understand an entity's computing resources and their relationships, permitting for easier management and configuration of the resources.

DETAILED DESCRIPTION

As noted in the background, a configuration management database (CMDB) is a database that can store information regarding computing resources, which may be part of an information technology (IT) infrastructure of an entity like a large corporation. The computing resources can include hardware resources and software resources. Hardware resources can include individual computing devices, such as computers, as well as their constituent hardware components, and other types of devices, including network devices, imaging devices, and so on. Software resources can include individual pieces of software running on the hardware resources, as well as database and software services, including cloud and web services, that the hardware resources provide.

Discovery is the process of discovering the computing resources of an IT infrastructure and populating a CMDB with configuration items (CIs) that represent the computing resources. A CI for a computing resource includes the information that describes the resource, including the type of resource, the capabilities of the resource, the location of the resource, and so on. The CMDB organizes the CIs logically in correspondence with the relationships among their respective computing resources within the infrastructure. The CMDB permits administrators and other users to understand the resources of the infrastructure, permitting the resources to more easily be managed.

A discovery adapter provides executable logic for discovering particular types of computing resources of an IT infrastructures, and is an abstraction of discovery capability. An input query specifies how the computing resources can be discovered using the discovery adapter, and can be defined in a topology query language (TQL). The input query is a regular, editable query that defines the query against the CMDB. A given input query can have multiple trigger queries that are each a subset of the input query. Each trigger query is associated with a corresponding discovery job for the input query, and thus enables reuse of a discovery adapter for a different discovery process flow.

A trigger query has one or multiple trigger CIs, which are used as the input CIs for the discovery adapter as a starting point of a corresponding discovery activity. Different discovery jobs can thus use the same discovery adapter differently by specifying different sets of trigger CIs. When a discovery job is enabled, the trigger CIs are calculated based on the trigger query corresponding to the discovery job. Calculation entails generating the trigger CIs according to the subset of the input query that is the trigger query.

The trigger CIs are dispatched to data probes on the IT infrastructure to discover computing resources matching the trigger CIs, and report them back to the discovery adapter for populating the CMDB. A data probe is an agent that runs on the IT infrastructure itself that is the subject of discovery, in order to identify computing resources matching the trigger CIs and report back CIs of these matching resources. The discovery process is iterative. Initially triggered CIs may result in discovery of computing resources represented by CIs that match other trigger CIs, which in turn may be dispatched to suitable data probes, and so on.

A difficulty with the discovery process is that a large number of similar trigger CIs may identify the same set of matching computing resources, and therefore report back the same CIs. Before CIs of the matching computing resources are populated in the CMDB, they have to be stored in memory. With a large number of duplicative CIs, memory can be constrained when temporarily caching or storing the CIs before they are populated within the CMDB. At a minimum, discovery performance is likely to be impaired, and at worst, the discovery process may be prematurely terminated due to out-of-memory conditions.

For example, each of 1,000 similarly trigger CIs may identify the same 2,000 computing resources. Therefore, 1,000×2,000=2,000,000 CIs representing the computing resources are temporarily stored in memory. However, for each of the 2,000 computing resources, there are 1,000 duplicative CIs. Moreover, each of the trigger CIs may be part of a corresponding discovery job that in actuality relates to just one of the computing resources. As such, while 2,000 CIs are reported as a result of each of the 1,000 trigger CIs, in actuality just 1,000 CIs are relevant, with one CI for each of the 1,000 trigger CIs.

Techniques described herein ameliorate these issues. The techniques provide for a filter parameter of an input query that can be replaced with a parameter of a discovery job when calculating the trigger CIs of the trigger query for that discovery job. Therefore, computing resources matching a trigger CI are more precisely identified, resulting in a reduction in the number of CIs that are reported and that have to be temporarily stored in memory prior to population in the CMDB. As such, discovery performance is improved, and the likelihood that out-of-memory conditions will occur is reduced if not eliminated.

In the aforementioned example, when each of the 1,000 trigger CIs is calculated, the filter parameter of the input query is replaced within the trigger query by a parameter of the discovery job corresponding to the trigger query defining the trigger CI in question. Therefore, instead of each of the 1,000 trigger CIs matching the same 2,000 computing resources, each trigger CI matches a corresponding computing resource. One CI is reported for each trigger CI, instead of 2,000 CIs being reported for each of the 1,000 trigger CIs.

Figure 1:
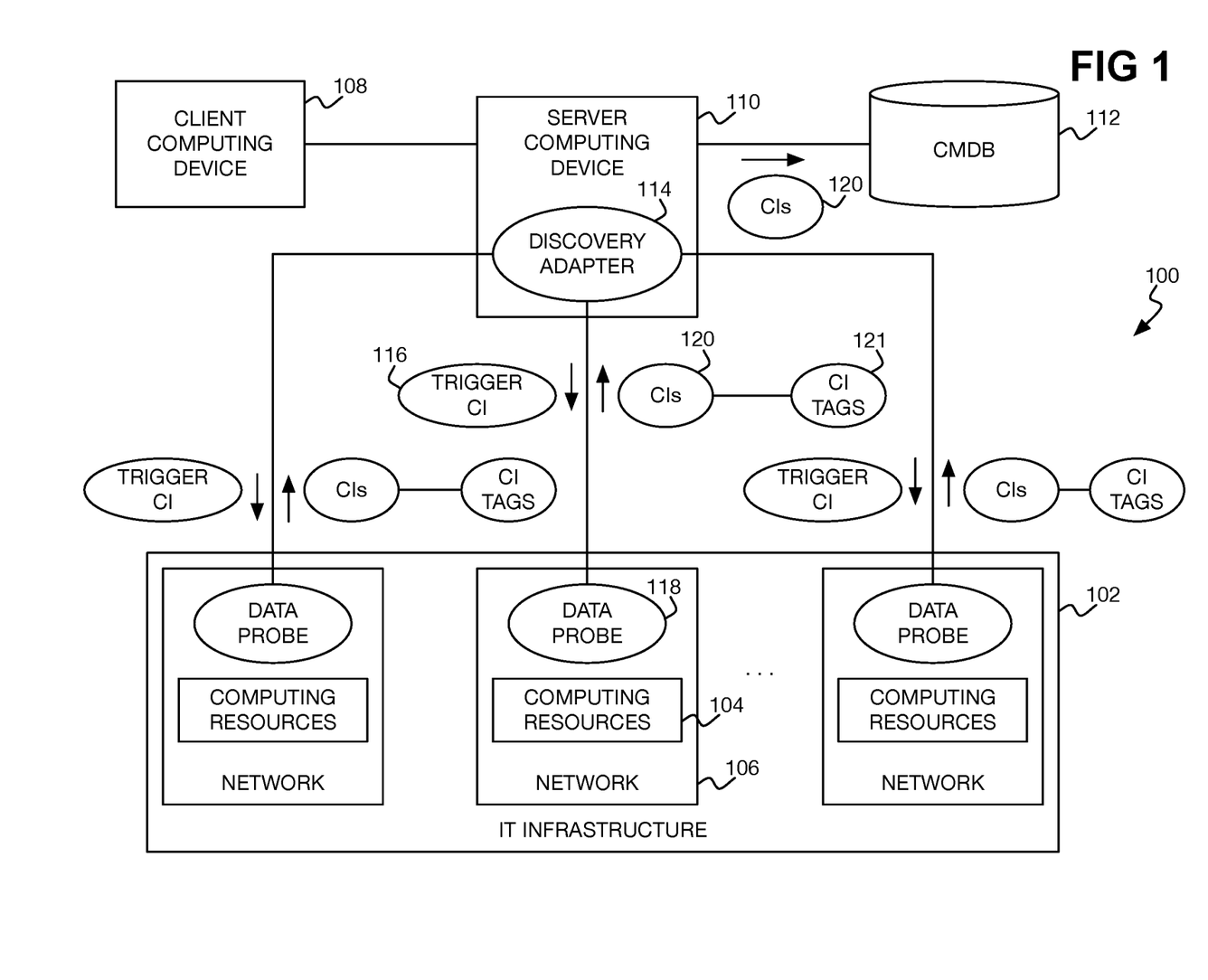
FIG. 1 is a diagram of an example architecture by which computing resources of an information technology (IT) infrastructure can be discovered and represented within a configuration management database (CMDB) as configuration items (CIs).

FIG. 1 shows an example architecture 100 in which an information technology (IT) infrastructure 102 can have its computing resources 104 discovered. The IT infrastructure 102 may be that of an entity, such as a corporation or other entity. The computing resources 104 can included hardware resources and software resources, and may be deployed on various geographically disparate networks 106 of the entity. That is, IT infrastructure 102 of the entity may include multiple networks 106, where each network 106 includes a subset of the computing resources 104 of the entity.

A client computing device 108, which may be a desktop or laptop computer or another type of computing device of an administrator or other user of the entity, may initiate discovery of computing resources 104 via communication with a server computing device 110. The server computing device 110 in turn populates a CMDB 112 as the computing resources 104 are discovered. The CMDB 112 may be disposed on the same or different computing device or devices as the server computing device 110. The server computing device 110 and the CMDB 112 may be considered as a part of the IT infrastructure 102, or separate from the infrastructure 102.

The server computing device 110 includes a discovery adapter 114 that provides the executable logic for discovering the computing resources 104 on the networks 106 of the infrastructure 102, and thus provides an abstraction of how the computing resources 104 are discoverable. The discovery process entails the discovery adapter 114 dispatching or deploying trigger CIs 116 to data probes 118 locally running on the computing resources 104. The data probes 118 identify the computing resources 104 matching the received trigger CIs 116, and provide back CIs 120 of the resources 104 that match the trigger CIs 116.

The CIs 120 may include corresponding CI tags 121, which can constitute metadata regarding the CIs 120. Stated another way, the information contained in the CIs 120 may be divided into different CI tags 121, where a given CI 120 may have a different value for each CI tag 121. As the discovery adapter 114 receives the CIs 120 (including the CI tags 121), it temporarily stores or caches the CIs 120 in memory of the server computing device 110. As the discovery adapter 114 processes the CIs 120, it removes them from memory and stores the CIs 120 within the CMDB 112 (thus populating the CMDB 112).

Figure 2:
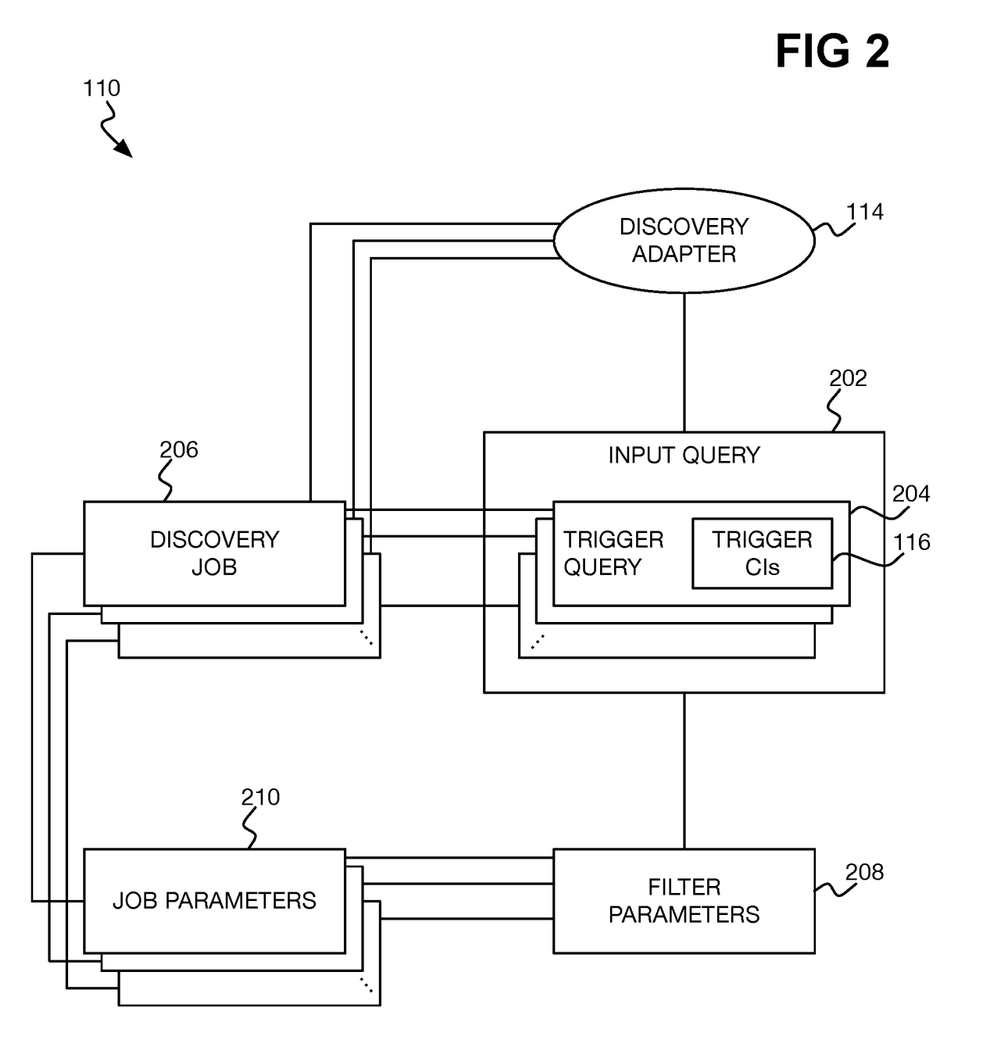
FIG. 2 is a diagram of an example server computing device of the architecture of FIG. 1 in detail, depicting aspects of the server computing device aiding in discovery of computing resources of the IT infrastructure.

FIG. 2 shows the server computing device 110 in detail. The discovery adapter 114 has a corresponding or associated input query 202. The input query 202 is defined in a TQL, and specifies how the computing resources 104 of the IT infrastructure 102 can be discovered using the discovery adapter 114. That is, whereas the discovery adapter 114 abstracts the discovery process, how the discovery process is actually used is defined by the input query 202. The input query 202 can be considered as constituting a set of trigger queries 204, where each trigger query 204 is a subset of the input query 202.

Stated another way, there are discovery jobs 206 associated with the discovery adapter 114 that are initiated to identify different types of computing resources 104 of the IT infrastructure 102. Each discovery job 206 has an associated trigger query 204, and thus an associated subset of the input query 202. Whereas the input query 202 defines how the discovery process abstracted by the discovery adapter 114 is used overall for discovery of the computing resources 104, a trigger query 204 defines how this discovery process is used for discovery of a particular set or type of the computing resources 104 in an associated discovery job 206.

Each trigger query 204 includes multiple trigger CIs 116. When a discovery job 206 is to be enabled or executed, the trigger CIs 116 are first calculated (i.e., generated) based on their trigger query 204. The trigger CIs 116 are then dispatched to respective data probes 118 as has been described in relation to FIG. 1, such that the data probes 118 identify computing resources 104 matching the trigger CIs 116. A trigger CI 116 is calculated as specified by its trigger query 204, and thus in accordance with the execution logic that the discovery adapter 114 provides to identify the computing resources 104 of the IT infrastructure 102.

In the implementation of FIG. 2, the input query 202 has a filter parameter 208. The trigger queries 204 may define their trigger CIs 116 in relation to the filter parameter 208. When the trigger CIs 116 of the trigger query 204 are generated, the trigger CIs 116 are effectively filtered by replacing the filter parameter 208 with a discovery job parameter 210 of the discovery job 206 with which the trigger query 204 is associated. Therefore, the computing resources 104 that will match a trigger CI 116 are limited to those that match the job parameter 210 of the discovery job 206.

As an example, there may be a trigger CI 116 for each of a number of different cloud compute service instances. The trigger CI 116 may specify cloud storage service instances. If there are 1,000 cloud compute service instances (and thus 1,000 trigger CIs 116), and if there are 2,000 cloud storage service instances, this means that each trigger CI 116 will match the same 2,000 cloud storage service instances. However, in actuality, each cloud compute service instance may just have an associated cloud storage service instance, identified by a common account name.

In this example, the filter parameter 208 may specify account name as a dynamic parameter. The discovery job 206 for a trigger CI 116 may specify the actual value of an account name. If there are 1,000 discovery jobs 206 for 1,000 cloud computing instances, each discovery job 206 will have the actual account name of a corresponding cloud computing instance. Therefore, each trigger CI 116 when calculated will have the filter parameter 208 replaced with the actual account name of its corresponding discovery job 206. When the triggers CI 116 are dispatched, they will thus each just identify the cloud storage service instance having the matching account name. 1,000 cloud storage server instances will be identified, instead of 1,000×2,000 such instances.

The filter parameter 208 can specify a fixed value of a job parameter 210, as in the described example. More generally, the filter parameter 208 can specify a regular expression of the job parameter 210. Therefore, how the filter parameter 208 is replaced within the trigger CIs 116 can be flexibly defined. The filter parameter 208 is replaced within the trigger CIs 116 at the time the trigger CIs 116 are calculated, and thus prior to actual discovery of matching computing resources 104 within the IT infrastructure 102. This increases performance as compared to if filtering occurred post- or during discovery.

That is, by having filtering occur pre-discovery, the data probes 118 just identify the computing resources 104 that match the filtered trigger CIs 116, reducing the number of CIs 120 that are returned for processing by the discovery adapter 114. However, if filtering occurred post- or during discovery, the data probes 118 would identify a larger number of resources 104, and return a larger number of CIs 120. The discovery adapter 114 would then have to filter the returned CIs 120 to discard those that do not match the filter parameter 208 (as replaced by the job parameter 210 for the discovery job 206 of a given trigger CI 116). The memory and performance benefits would not be realized.

Figure 3:
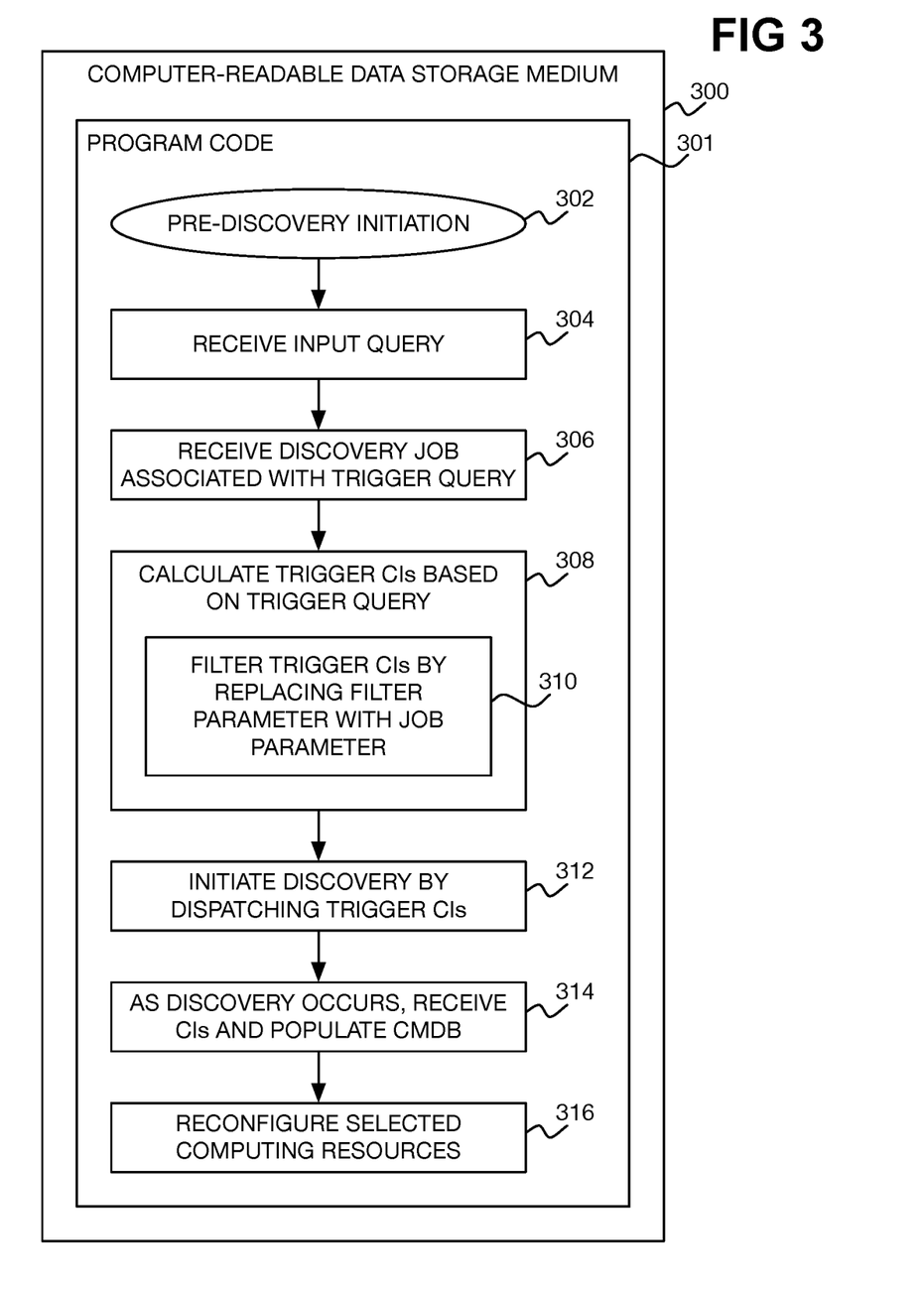
FIG. 3 is a diagram of an example non-transitory computer-readable data storage medium storing program code to discover computing resources of the IT infrastructure in FIG. 1 such that a filter parameter of an input query is replaced with a discovery job parameter prior to discovery initiation.

FIG. 3 shows an example non-transitory computer-readable data storage medium 300 storing program code 301 executable by a processor of the server computing device 110 to perform processing that realizes discovery of the computing resources 104 using filtered trigger CIs 116. The discovery adapter 114 can perform the processing of FIG. 3, for instance. Prior to initiation of discovery (302), an input query 202 specifying how the computing resources 104 are discovered is received (304).

A discovery job 206 for the input query 304 and associated with a trigger query 204 of the input query 304 is also received (306). It is noted that there may be multiple discovery jobs 206. For example, there may be a first discovery job 206 associated with a first trigger query 204 of the input query 304 and a second discovery job 206 associated with a second trigger query 204 of the input query 304. More generally, then, the processing of FIG. 3 is performed for each such discovery job 206.

The input query 202 includes a filter parameter 208, and the discovery job 206 includes a job parameter 210. Therefore, when trigger CIs 116 for the discovery job 206 are calculated based on the trigger query 204 associated with the discovery job 206 (308), the trigger CIs 116 are filtered by replacing the filter parameter 208 with the job parameter 210 (310). The trigger CIs 116 are considered as having been filtered insofar as the number of computing resources 104 that will match the trigger CIs 116 are in effect reduced— and prior to actual discovery of the resources 104 occurring.

Discovery is then initiated by dispatching the calculated trigger CIs 116 to data probes 118 locally running on IT infrastructure 102 (312). The data probes 118 identify computing resources 104 that match the trigger CIs 116. Therefore, as discovery occurs, CIs 120 representing computing resources 104 matching the trigger CIs 116 are received from the data probes 118, and ultimately the CMDB 112 is populated with these matching CIs 120 (314). More specifically, upon receipt of the matching CIs 120, the discovery adapter 114 may first temporarily store them in memory of the server computing device 110, before then writing the CIs 120 to the CMDB 112.

As noted, the CMDB 112 provides a way by which the computing resources 104 of the IT infrastructure of an entity can be understood. What computing resources 104 are present, as well as the relationships among these computing resources 104, can thus be gleaned by appropriately querying the CMDB 112. This means that the IT infrastructure 102 can be managed using the CIs 120 populated within the CMDB 112. For instance, selected computing resources 104 can be reconfigured based on their respective CIs 120 (either alone or in relation to other CIs of other computing resources 104) stored in the CMDB 112 (316).

Therefore, the filtering of trigger CIs 116 provides technological improvement to the management, including the reconfiguration, of computing resources 104 within an IT infrastructure 102. Such filtered trigger CIs 116 also improves performance of the architecture 100 in which discovery of the computing resources 104 occurs. Discovery is more performant because fewer matching computing resources 104 may be identified for a given trigger CI 116. Moreover, exhaustion of memory of the server computing device 110 during discovery is reduced if not eliminated, since fewer matching CIs have to be temporarily stored in memory.

The techniques described in relation to FIGS. 2 and 3 particularly concern how a filter parameter 208 of an input query 202 can be replaced with job parameters 210 of discovery jobs 206 when calculating trigger CIs 116 for the trigger queries 204 associated with the discovery jobs 206. The techniques have been described in relation to discovery jobs 206 in isolation with one another, where when the trigger CIs 116 for a discovery job 206 are generated, the filter parameter 208 is replaced with the job parameter 210 of that discovery job 206. However, discovery jobs 206 may be dependent on one another, and the described filter parameter 208 leveraged in such dependency.

Figure 4:
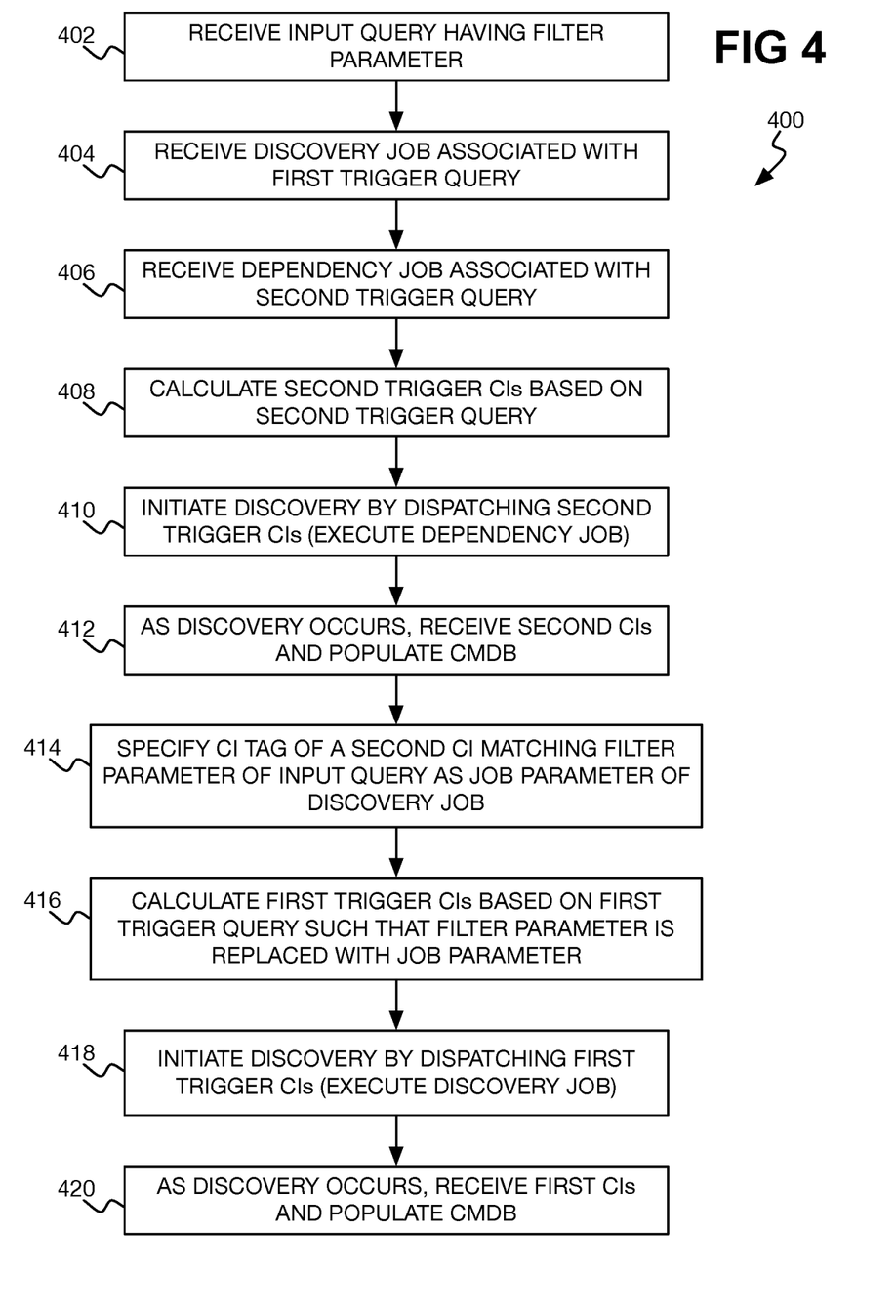
FIG. 4 is a flowchart of an example method for discovery computing resources of the IT infrastructure in FIG. 1 initially via a dependency job and then via a discovery job, where a CI tag of a CI obtained via the former job is specified as a discovery job parameter of the latter job that replaces a filter parameter of an input query.

FIG. 4 shows an example method 400 in which the filter parameter 208 of an input query 202 is leveraged in such dependent discovery jobs 206. The method 400 is described in relation to a first discovery job 206, which is also referred to as just "the discovery job 206," and a second, dependency discovery job 206, which is also referred to as just "the dependency discovery job 206." The discovery job 206 is dependent on the dependency discovery job 206, in that discovery is first performed as to the latter discovery job 206 to control, influence, or affect subsequent discovery according to the former discovery job 206.

The method 400 can be implemented as program code stored on a non-transitory computer-readable data storage medium and executed by a processor of the server computing device 110, such as via the discovery adapter 114. The input query 204 associated with the discovery adapter 114 is received as before (402), where the input query 204 has a filter parameter 208. A (first) discovery job 206 associated with a first trigger query 204 of the input query 202 is also received (404), as is a (second) dependency discovery job 206 associated with a second trigger query 204 of the input query 202 (406).

Second trigger CIs 116 are calculated based on the second trigger query 204 associated with the dependency discovery job 206 (408). Discovery according to the dependency discovery job 206 is then initiated by dispatching the second trigger CIs 116 to the data probes 118 (410). That is, the dependency discovery job 206 is executed. As discovery occurs, second CIs 120 representing second computing resources 104 matching the second trigger CIs 116 are received, and the CMDB is accordingly populated with these second CIs 120 (412).

As noted above, CIs 120 have CI tags 121. Therefore, completion of the second dependency discovery job 206 results in generation of CI tags 121 of the second CIs 120. In the implementation of FIG. 4, the filter parameter 208 of the input query 202 specifies a job parameter 210 (including a regular expression thereof) of the first discovery job 206. Furthermore, the job parameter 210 is populated with a CI tag 121 of a second CI 120. Therefore, in effect, the dependency discovery job 206 controls discovery according to the first discovery job 206, since the CI tag 121 of a second CI 120 is used as the job parameter 210 of the first discovery job 206.

In particular, the CI tag 121 of the second CI 120 matching the filter parameter 208 of the input query 202 is specified as the job parameter 210 of the first discovery job 206 (414). Therefore, when first trigger CIs 116 are calculated based on the first trigger query 204 associated with the first discovery job 206, the filter parameter 208 is replaced within the first trigger CIs 116 by the CI tag 121 in question (416). The filter parameter 208 is thus used so that the dependency discovery job 206 controls the first discovery job 206—a CI tag 121 of a matching second CI 120 returned by the dependency discovery job 206 is used when generating the first trigger CIs 116 of the first discovery job 206.

Discovery according to the first discovery job 206 is then initiated by dispatching the calculated first trigger CIs 116 to the data probes 118 locally running on the IT infrastructure 102 (418). That is, the first discovery job 206 is executed. In this respect, the first discovery job 206 is executed after the second dependency discovery job 206 has been completed. As discovery occurs, first CIs 120 representing first computing resources 104 matching the first trigger CIs 116 are received, and the CMDB is accordingly populated with these first CIs 120 (420).

Figure 5:
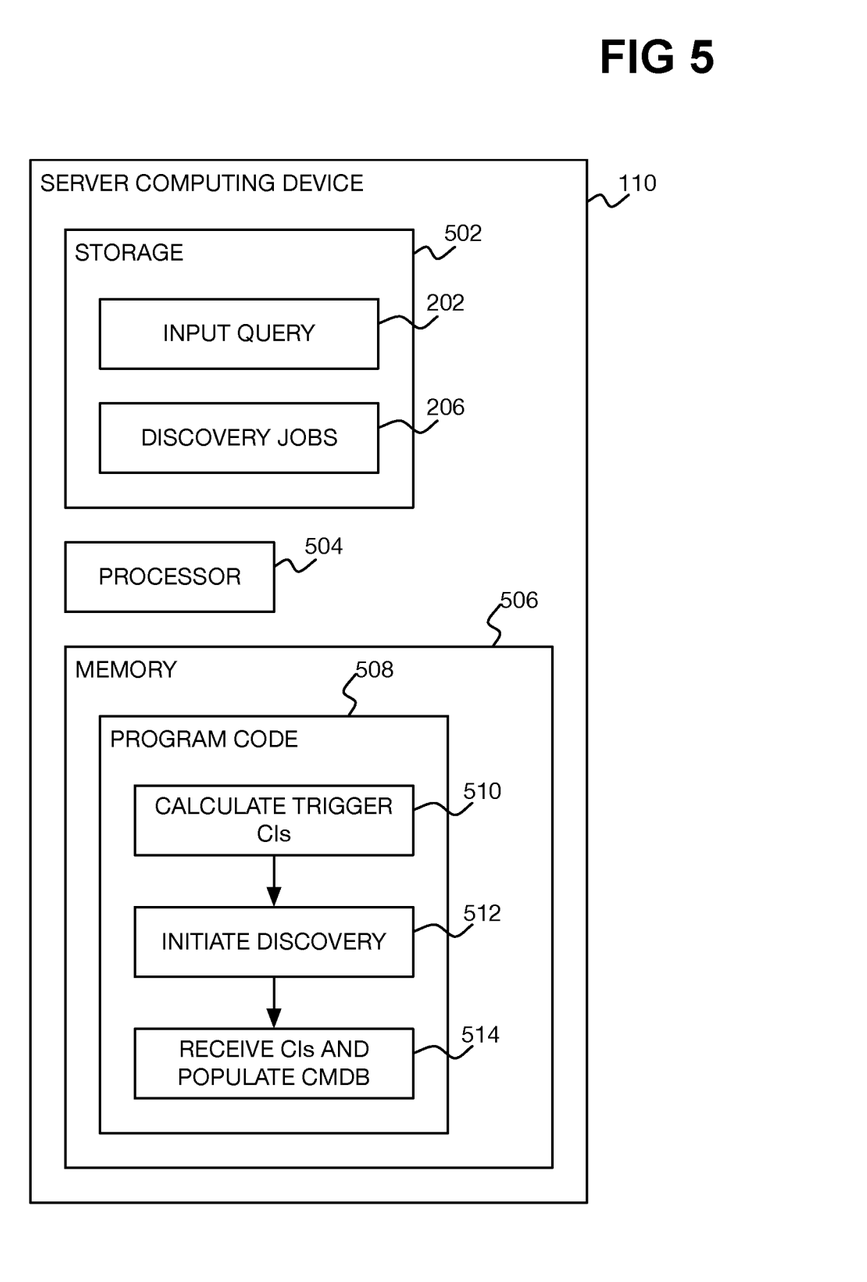
FIG. 5 is a diagram of an example implementation of the server computing device of the architecture of FIG. 1.

FIG. 5 shows an example implementation of the server computing device 110. The server computing device 110 can include a storage 502, a processor 504, and a memory 506, which is an example of a non-transitory computer-readable data storage medium. The storage 502 may be a non-volatile storage device, such as a hard disk drive (HDD) or a solid-state drive (SSD). The memory 506 stores program code 508 executable by the processor 504.

The storage 502 stores an input query 202 specifying how computing resources 104 of an IT infrastructure 102 are discovered. The input query 202 has a filter parameter 208 as has been described. The storage 502 stores one or more discovery jobs 206 for the input query 202. Each discovery job 206 has a job parameter 210 and is associated with a trigger query 204 that is a subset of the input query 202, as has also been described.

The program code 508 is executable by the processor 504 to perform processing, such as that of FIGS. 3 and 4 that has been described. For instance, for each discovery job 206, the processing can include calculating one or more trigger CIs 116 based on the trigger query 204 of the discovery job 206 (510). During such calculation, the filter parameter 208 of the input query 202 is replaced with the job parameter 210 in the trigger CIs 116 for the discovery job in question.

The processing can include then initiating discovery of computing resources 104 of the IT infrastructure 102 by dispatching each trigger CI 116 for each discovery job 206 (512). The processing can include, as discovery of the computing resources 104 occurs, receiving CIs 120 representing the computing resources 104 matching the trigger CIs 116 of the discovery jobs 206 and accordingly populating the CIs 120 within the CMDB 112 (514).

Techniques have been described for discovery of computing resources 104 in which a filter parameter 208 of an input query 202 is replaced with a discovery job parameter 210 of a discovery job 206 when calculating trigger CIs 116 for the discovery job 206. Such filtering of trigger CIs 116 occurs prior to execution of the discovery job 206. The described filtered trigger CIs 116 improve discovery performance, and reduces if not eliminates the likelihood that memory will be exhausted during discovery.

We claim:

1. A non-transitory computer-readable data storage medium storing program code executable by a processor to perform processing comprising:
   prior to initiating discovery of computing resources of an information technology (IT) infrastructure:
      receiving an input query specifying how the computing resources are discovered, the input query having a filter parameter;
      receiving a discovery job for the input query, the discovery job having a job parameter and associated with a trigger query that is a subset of the input query;
      calculating one or more trigger configuration items (CIs) based on the trigger query, such that the filter parameter of the input query is replaced with the job parameter in the one or more trigger CIs;
   initiating discovery of the computing resources by dispatching each trigger CI of the one or more trigger CIs; and
   as discovery of the computing resources occurs, receiving CIs representing the computing resources matching the one or more trigger CIs and populating the CIs within a configuration management database (CMDB).

2. The non-transitory computer-readable data storage medium of claim 1, wherein the processing further comprises:
   upon population of the CIs within the CMDB, reconfiguring one or more selected computing resources using populated CIs of the one or more selected computing resources.

3. The non-transitory computer-readable data storage medium of claim 1, wherein the input query is associated with a discovery adapter providing executable logic for discovering the computing resources, the input query specifying how the computing resources are discovered using the discovery adapter.

4. The non-transitory computer-readable data storage medium of claim 1, wherein dispatching each trigger CI comprises:
   dispatching each trigger CI to a data probe associated with a particular network of the computing resources of the IT infrastructure.

5. The non-transitory computer-readable data storage medium of claim 1, wherein the trigger query of the input query as received defines the trigger CIs using the filter parameter, and wherein calculating the trigger CIs based on the trigger query comprises:
   filtering the trigger CIs by replacing the filter parameter in the trigger CIs with the job parameter.

6. The non-transitory computer-readable data storage medium of claim 1, wherein the filter parameter specifies a fixed value of the job parameter.

7. The non-transitory computer-readable data storage medium of claim 1, wherein the filter parameter specifies a regular expression of the job parameter.

8. The non-transitory computer-readable data storage medium of claim 1, wherein the filter parameter specifies a tag of the job parameter populated by a dependency discovery job.

9. The non-transitory computer-readable data storage medium of claim 8, wherein the processing further comprises, prior to initiating discovery of the computing resources by dispatching each trigger CI:
   initiating the dependency discovery job, completion of the dependency discovery job resulting in generation of a CI tag; and specifying the CI tag as the job parameter of the discovery job, wherein calculating the trigger CIs based on the trigger query results in replacement of the filter parameter of the input query with the CI tag in the trigger CIs.

10. The non-transitory computer-readable data storage medium of claim 8, wherein the discovery job is a first discovery job for the input query, the dependency discovery job is a second discovery job for the input query, the trigger query is a first trigger query that is a first subset of the input query, and the trigger CIs are first trigger CIs for the first discovery job, and the CIs are first CIs, the processing further comprising, prior to initiating discovery of the computing resources by dispatching each first trigger CI:

receiving the second discovery job for the input query, the second discovery job associated with a second trigger query that is a second subset of the input query;

calculating one or more second trigger CIs based on the second trigger query;

initiating initial discovery of the computing resources by dispatching each second trigger CI of the one or more second trigger CIs;

as initial discovery of the computing resources occurs due to dispatching each second trigger CI, receiving second CIs representing the computing resources matching the one or more second trigger CIs and populating the second CIs within the CMDB; and upon completion of the second discovery job, specifying a CI tag of one of the second CIs matching the filter parameter as the job parameter of the first discovery job, wherein calculating the first trigger CIs based on the first trigger query results in replacement of the filter parameter of the input query with the CI tag in the first trigger CIs.

11. The non-transitory computer-readable data storage medium of claim 1, wherein the discovery job is a first discovery job for the input query, the job parameter is a first job parameter of the first discovery job, the trigger query is a first trigger query that is a first subset of the input query, the trigger CIs are first trigger CIs for the first discovery job, and the CIs are first CIs, the processing further comprising:

receiving one or more second discovery jobs for the input query, each second discovery job having a second job parameter and associated with a second trigger query that is a second subset of the input query;

for each second discovery job, calculating one or more second CIs based on the second trigger query with which the second discovery job is associated, such that the filter parameter of the input query is replaced the second job parameter of the second discovery job in the one or more second trigger CIs of the second discovery job, wherein initiating discovery of the computing resources further comprises dispatching each second trigger CI of each second discovery job; and as discovery of the computing resources occurs, receiving second CIs representing the computing resources matching the one or more second trigger CIs and populating the second CIs within the CMDB.

12. A computing device comprising:

a storage to store:

an input query specifying how computing resources of an information technology (IT) infrastructure are discovered, the input query having a filter parameter; and one or more discovery jobs for the input query, each discovery job having a job parameter and associated with a trigger query that is a subset of the input query;

a processor; and a memory storing program code executable by the processor to:

for each discovery job, calculate one or more trigger configuration items (CIs) based on the trigger query of the discovery job, such that the filter parameter of the input query is replaced with the job parameter in the one or more trigger CIs for the discovery job;

initiate discovery of computing resources of an information technology (IT) infrastructure by dispatching each trigger CI of the one or more trigger CIs for each discovery job;

as discovery of the computing resources occurs, receive CIs representing the computing resources matching the one or more trigger CIs of the discovery jobs and populate the CIs within a configuration management database (CMDB).

13. The computing device of claim 12, wherein the stored program code is executable by the processor to further:

upon population of the CIs within the CMDB, reconfigure one or more selected computing resources using populated CIs of the one or more selected computing resources.

14. The computing device of claim 12, wherein the filter parameter specifies a fixed value of the job parameter of each discovery job.

15. The computing device of claim 12, wherein the filter parameter specifies a regular expression of the job parameter of each discovery job.

16. The computing device of claim 12, wherein the filter parameter specifies a tag of the job parameter of each discovery job populated by a dependency discovery job.

17. The computing device of claim 16, wherein the stored program code is executable by the processor to further, prior to initiating discovery of the computing resources by dispatching each trigger CI for each discovery job:

initiating the dependency discovery job, completion of the dependency discovery job resulting in generation of a CI tag; and specifying the CI tag as the job parameter of each discovery job, wherein calculating the trigger CIs for each discovery job based on the trigger query results in replacement of the filter parameter of the input query with the CI tag in the trigger CIs for each discovery job.

18. A method comprising:

receiving, by a processor, an input query specifying how computing resources of an information technology (IT) infrastructure are discovered, the input query having a filter parameter;

receiving, by the processor, a discovery job for the input query, the discovery job having a job parameter and associated with a first trigger query that is a first subset of the input query;

receiving, by the processor, a dependency discovery job for the input query, the dependency discovery job associated with a second trigger query that is a second subset of the input query;

calculating, by the processor, one or more second trigger configuration items (CIs) based on the second trigger query;

initiating, by the processor, discovery of second computing resources by dispatching each second trigger CI of the one or more second trigger CIs;

as discovery occurs due to dispatching each second trigger CI, receiving, by the processor, second CIs representing the second computing resources matching the one or more second trigger CIs and populating the second CIs within a configuration management database (CMDB); and specifying, by the processor, a CI tag of one of the second CIs matching the filter parameter as the job parameter of the discovery job;

calculating, by the processor, one or more first trigger CIs based on the first trigger query, such that the filter parameter of the input query is replaced with the job parameter in the one or more first trigger CIs;

initiating, by the processor, discovery of first computing resources by dispatching each first trigger CI of the one or more first trigger CIs; and as discovery occurs due to dispatching each first trigger CI, receiving first CIs representing first computing resources matching the one or more first trigger CIs and populating the first CIs within the CMDB.

19. The method of claim 18, further comprising:

upon population of the second CIs within the CMDB, reconfiguring, by the processor, one or more selected computing resources using populated CIs of the one or more selected computing resources.

20. The method of claim 18, wherein the input query is associated with a discovery adapter providing executable logic for discovering the computing resources, the input query specifying how the computing resources are discovered using the discovery adapter.

* * * * *